(12) United States Patent
Gongwer et al.

(10) Patent No.: US 12,219,942 B2
(45) Date of Patent: Feb. 11, 2025

(54) AUTOMATICALLY ADJUSTING VARIABLE GEAR RATIO FISHING REEL

(71) Applicants: Drake Dean Gongwer, Wakarusa, IN (US); Anthony J. Parker, Wilkinson, IN (US)

(72) Inventors: Drake Dean Gongwer, Wakarusa, IN (US); Anthony J. Parker, Wilkinson, IN (US)

(\*) Notice: Subject to any disclaimer, the term of this patent is extended or adjusted under 35 U.S.C. 154(b) by 0 days.

(21) Appl. No.: 18/530,419

(22) Filed: Dec. 6, 2023

(65) Prior Publication Data
US 2024/0298625 A1 Sep. 12, 2024

Related U.S. Application Data

(60) Provisional application No. 63/488,547, filed on Mar. 6, 2023.

(51) Int. Cl.
*A01K 89/01* (2006.01)
*A01K 89/015* (2006.01)
*A01K 89/017* (2006.01)

(52) U.S. Cl.
CPC ...... *A01K 89/0189* (2015.05); *A01K 89/0184* (2015.05); *A01K 89/017* (2013.01); *A01K 89/0192* (2015.05)

(58) Field of Classification Search
CPC ............ A01K 89/0184; A01K 89/0186; A01K 89/0189; A01K 89/01902
See application file for complete search history.

(56) References Cited

U.S. PATENT DOCUMENTS

| 904,016 A | 11/1908 | Roberts |
| 2,417,732 A | 3/1947 | Barrett |

(Continued)

FOREIGN PATENT DOCUMENTS

| AU | 2019100532 A4 | 6/2019 | |
| CN | 104222036 A | * 12/2014 | ......... A01K 89/0172 |

(Continued)

OTHER PUBLICATIONS

International Search and Written Opinion in PCT/US2023/082024 dated Apr. 2, 2024, 9 pages.

(Continued)

*Primary Examiner* — Emmanuel M Marcelo
(74) *Attorney, Agent, or Firm* — Heslin Rothenberg Farley & Mesiti P.C.

(57) ABSTRACT

A fishing reel including a low-speed and a high-speed drive gear mounted on a crankshaft. The drive gears are affixed axially relative to the crankshaft. An engagement hub is mounted on the crankshaft between the drive gears. The hub is movable axially relative to the crankshaft. A yoke has a first end portion engaging the hub. A shifting mechanism engages a second end portion of the hub. A speed sensor detects rotational speed of the crankshaft. When the speed sensor detects rotational speed at or above a threshold speed, a command signal is sent to the shifting mechanism to move the yoke to axially urge the hub to engage with the high-speed drive gear. When the speed sensor detects rotational speed below the threshold speed, a command signal is sent to the shifting mechanism to move the yoke to axially urge the hub to engage with the low-speed gear.

20 Claims, 12 Drawing Sheets

(56) References Cited

U.S. PATENT DOCUMENTS

| | | | |
|---|---|---|---|
| 2,580,990 | A | 1/1952 | Bryant |
| 3,167,272 | A | 1/1965 | Frode |
| 3,499,609 | A | 3/1970 | Policansky |
| 3,600,964 | A | 8/1971 | Sarah |
| 3,675,502 | A | 7/1972 | Sarah |
| 4,148,228 | A | 4/1979 | Freeman |
| 4,566,655 | A | 1/1986 | Young |
| 4,867,392 | A * | 9/1989 | Sato .................. A01K 89/0184 192/48.91 |
| 4,966,335 | A * | 10/1990 | Kaneko ............... A01K 89/015 242/255 |
| 5,058,447 | A | 10/1991 | Ikuta |
| 5,161,751 | A | 11/1992 | Bolcavage |
| 5,297,756 | A * | 3/1994 | Ikuta .................. A01K 89/033 242/270 |
| 6,113,019 | A * | 9/2000 | Jewell ................. A01K 89/015 242/255 |
| 6,672,526 | B1 * | 1/2004 | Bledsoe ............. A01K 89/0184 242/255 |
| 6,997,409 | B1 | 2/2006 | Bledsoe et al. |
| 7,793,878 | B2 | 9/2010 | Kobayashi |
| 8,517,298 | B1 | 8/2013 | Benson |
| 2004/0004141 | A1 | 1/2004 | Bledsoe et al. |
| 2008/0173745 | A1 | 7/2008 | Takechi et al. |
| 2009/0166458 | A1 | 7/2009 | Murakami et al. |
| 2016/0106082 | A1 | 4/2016 | Lee |
| 2018/0092342 | A1 | 4/2018 | Lee |
| 2022/0079130 | A1 * | 3/2022 | Pulkrabek ............ A01K 89/046 |

FOREIGN PATENT DOCUMENTS

| | | |
|---|---|---|
| FR | 3070739 A3 | 3/2019 |
| GB | 2159592 A | 12/1985 |
| JP | 3159637 B2 | 4/2001 |
| JP | 2005253419 A | 9/2005 |
| JP | 2006014609 A | 1/2006 |
| JP | 2010051272 A | 3/2010 |
| JP | 4468288 B2 | 5/2010 |
| KR | 100212206 B1 | 8/1999 |

OTHER PUBLICATIONS

"Shimano's First Spinning Reel that Harnesses the Engineering Capabilities Derived from the Manufacture of Bicycle Components", 100 Products History | Shimano, Inc. | Retrieved on Dec. 1, 2023 from the Internet URL: <https://www.shimano.com/en/100th/history/products/result.php?id=9>, 3 pgs.

* cited by examiner

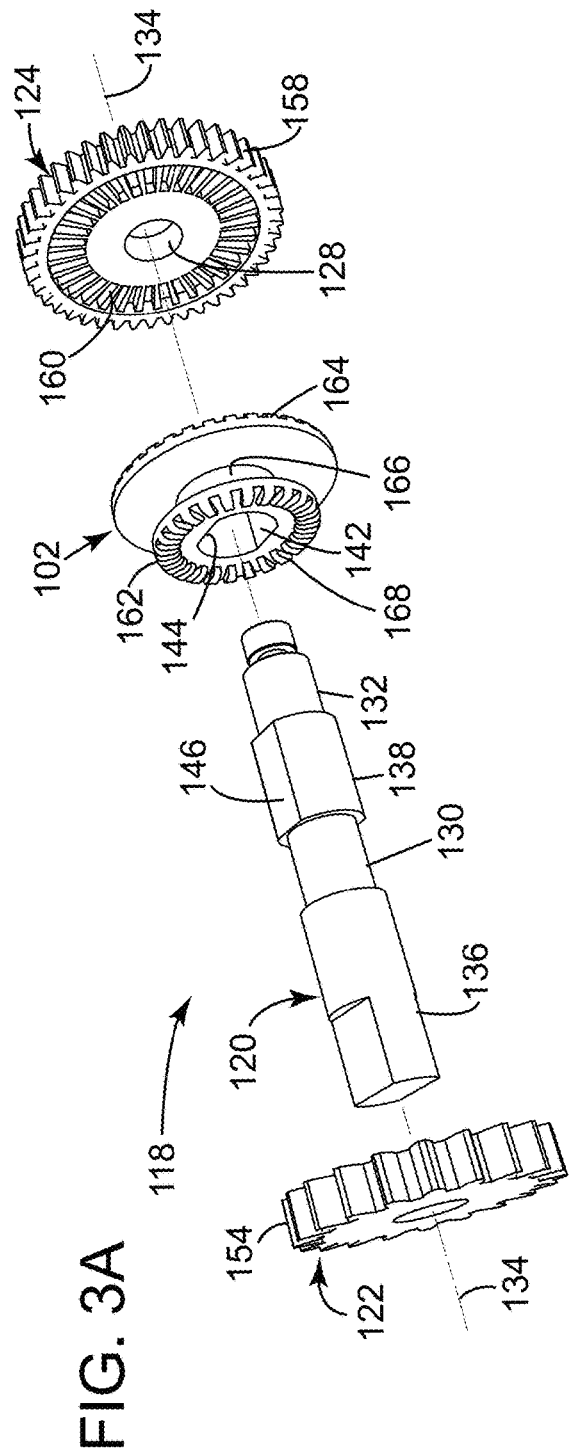
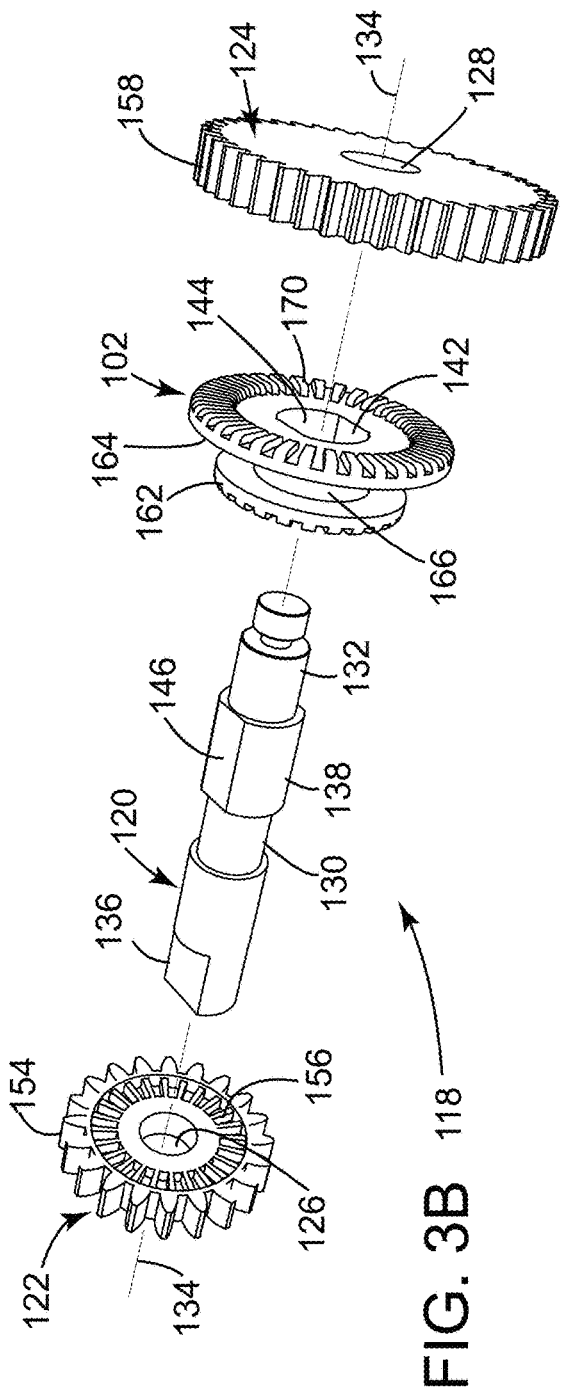
FIG. 3A
FIG. 3B

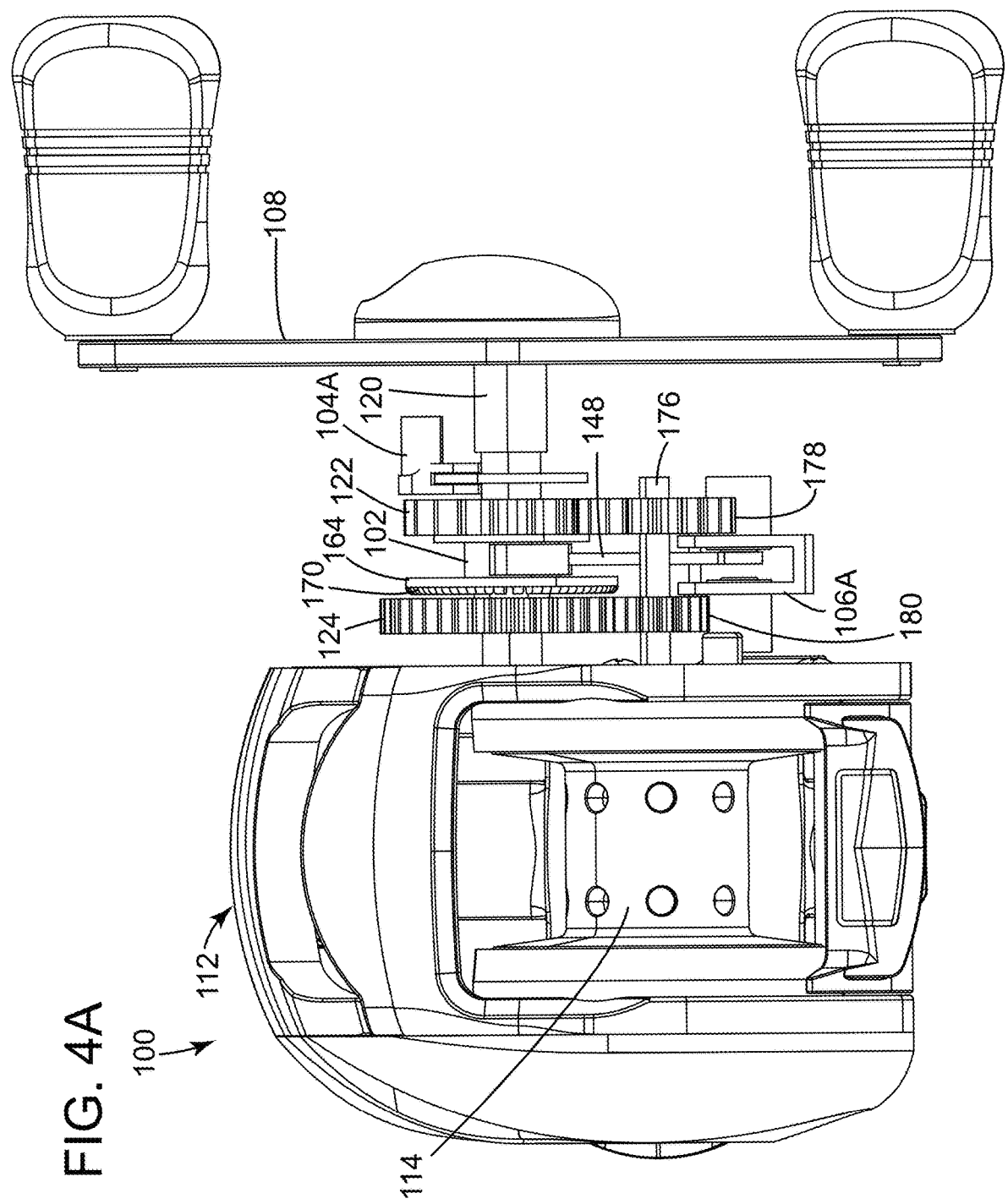

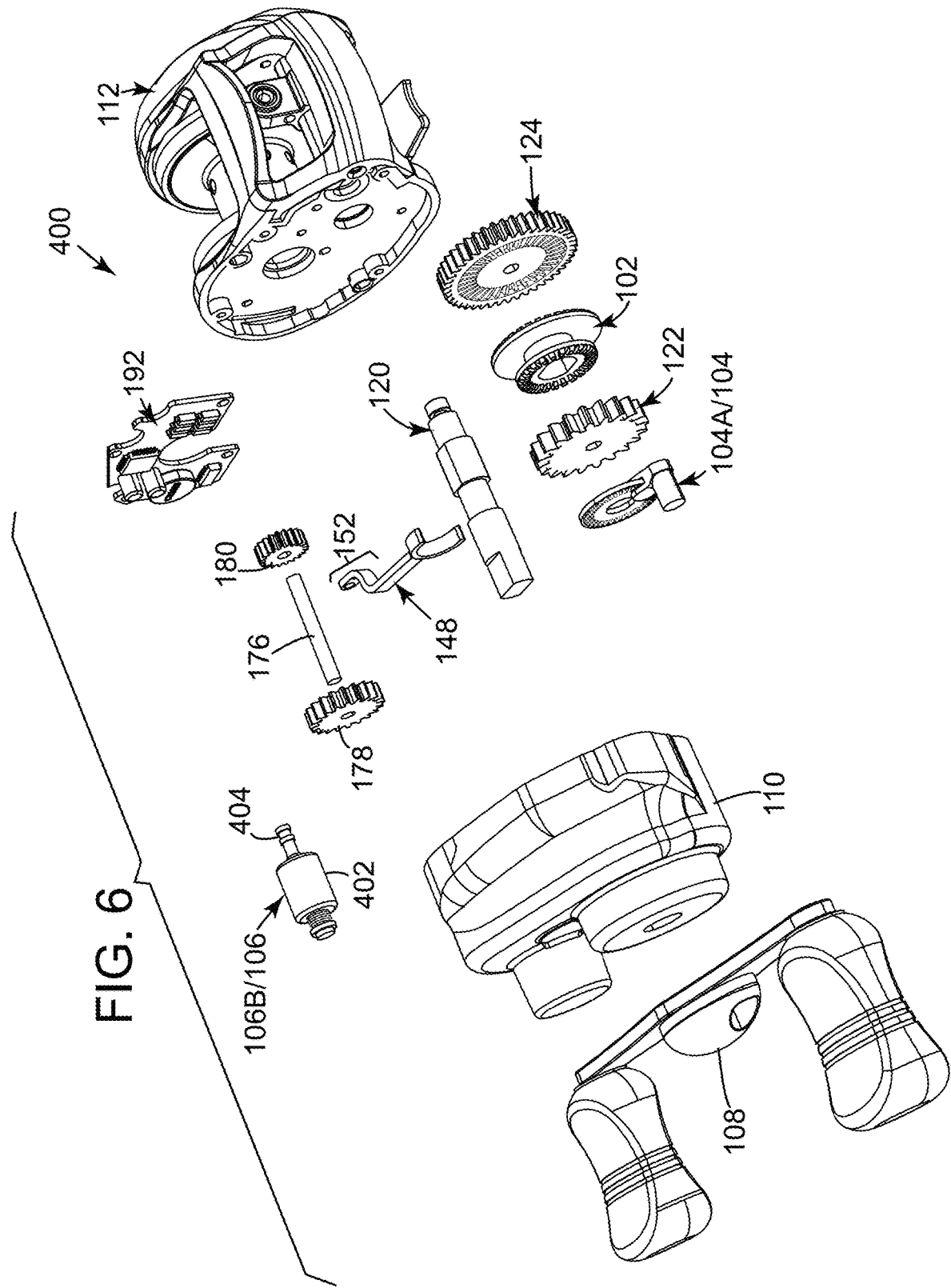

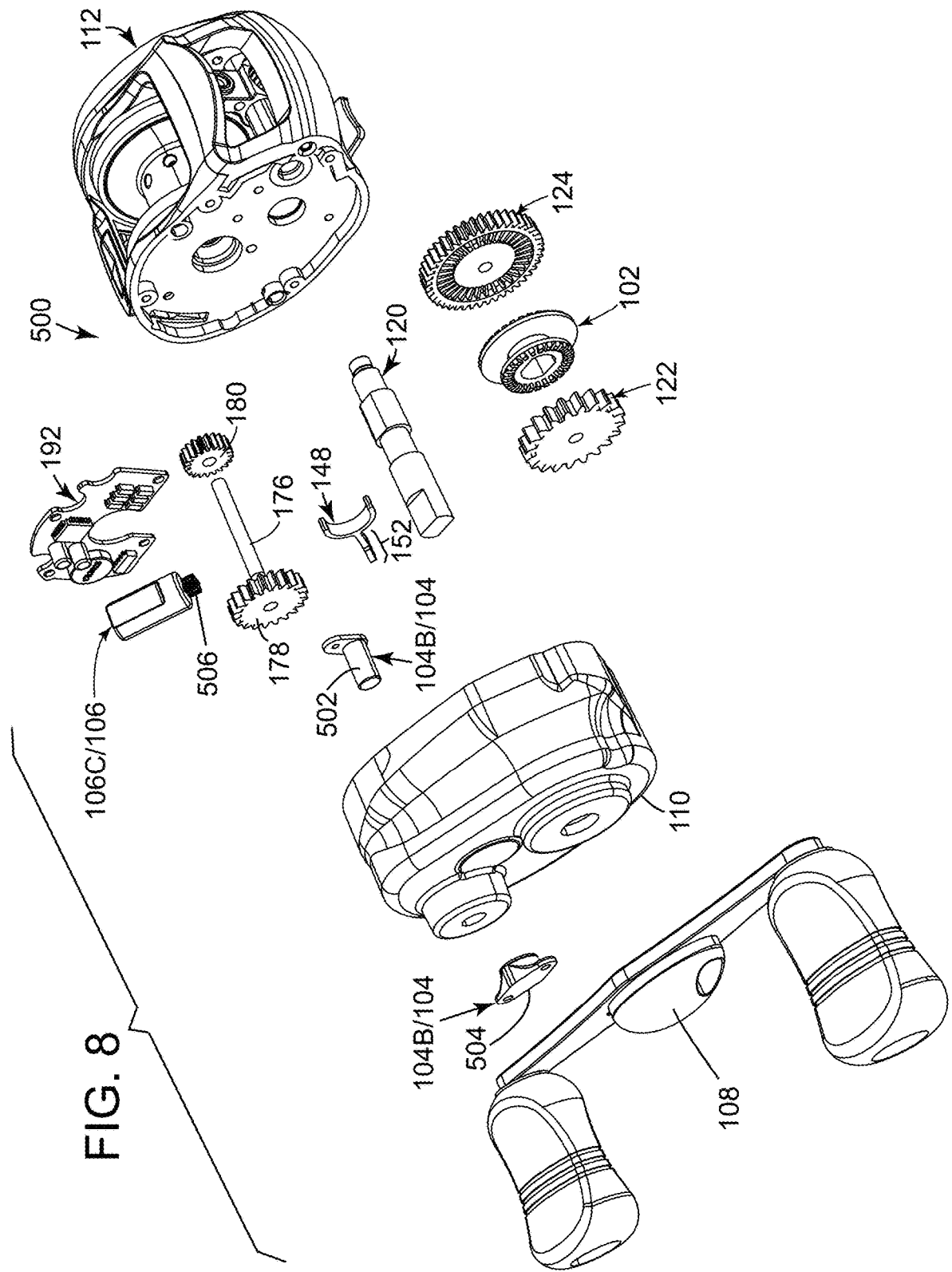

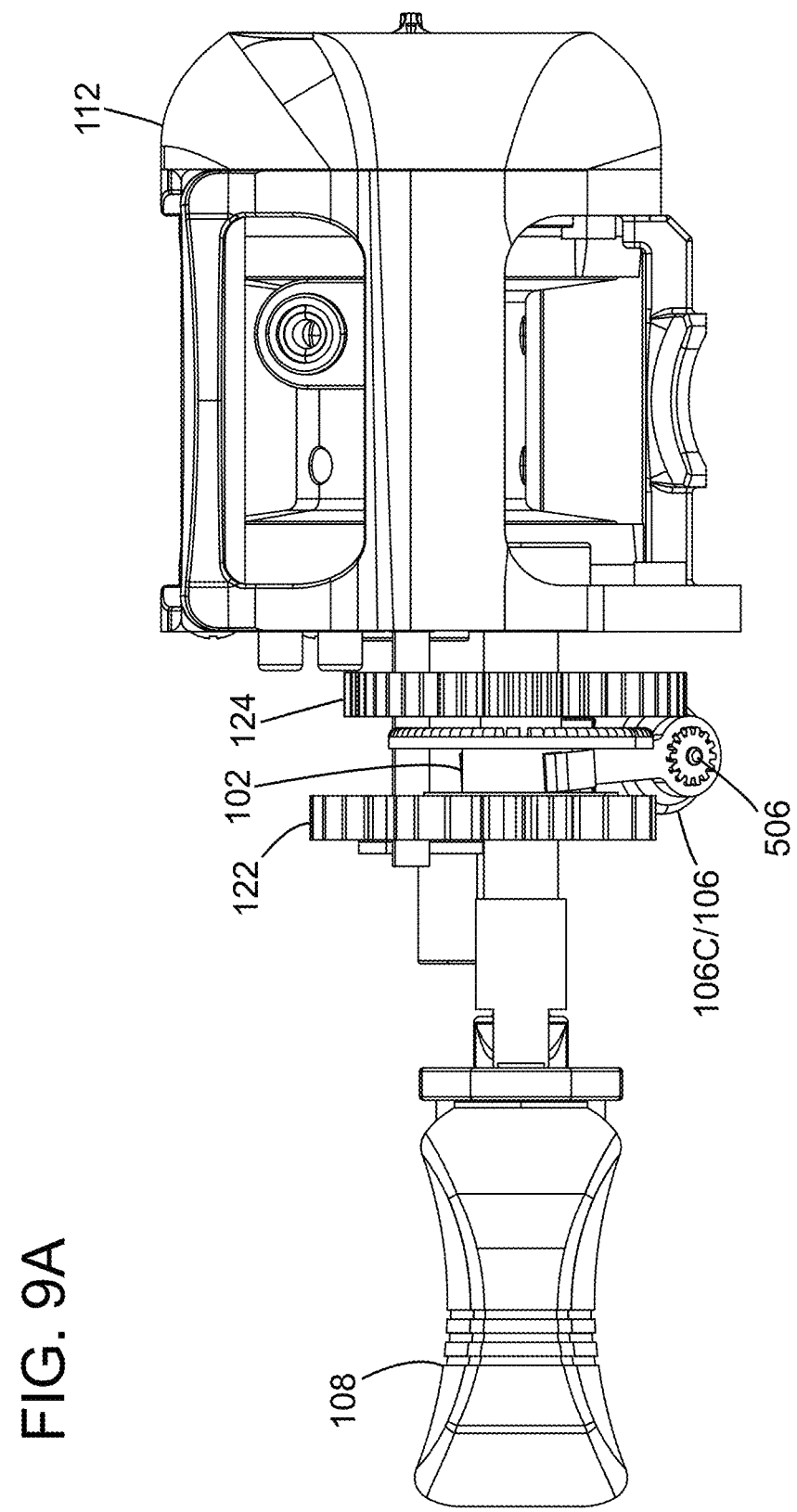

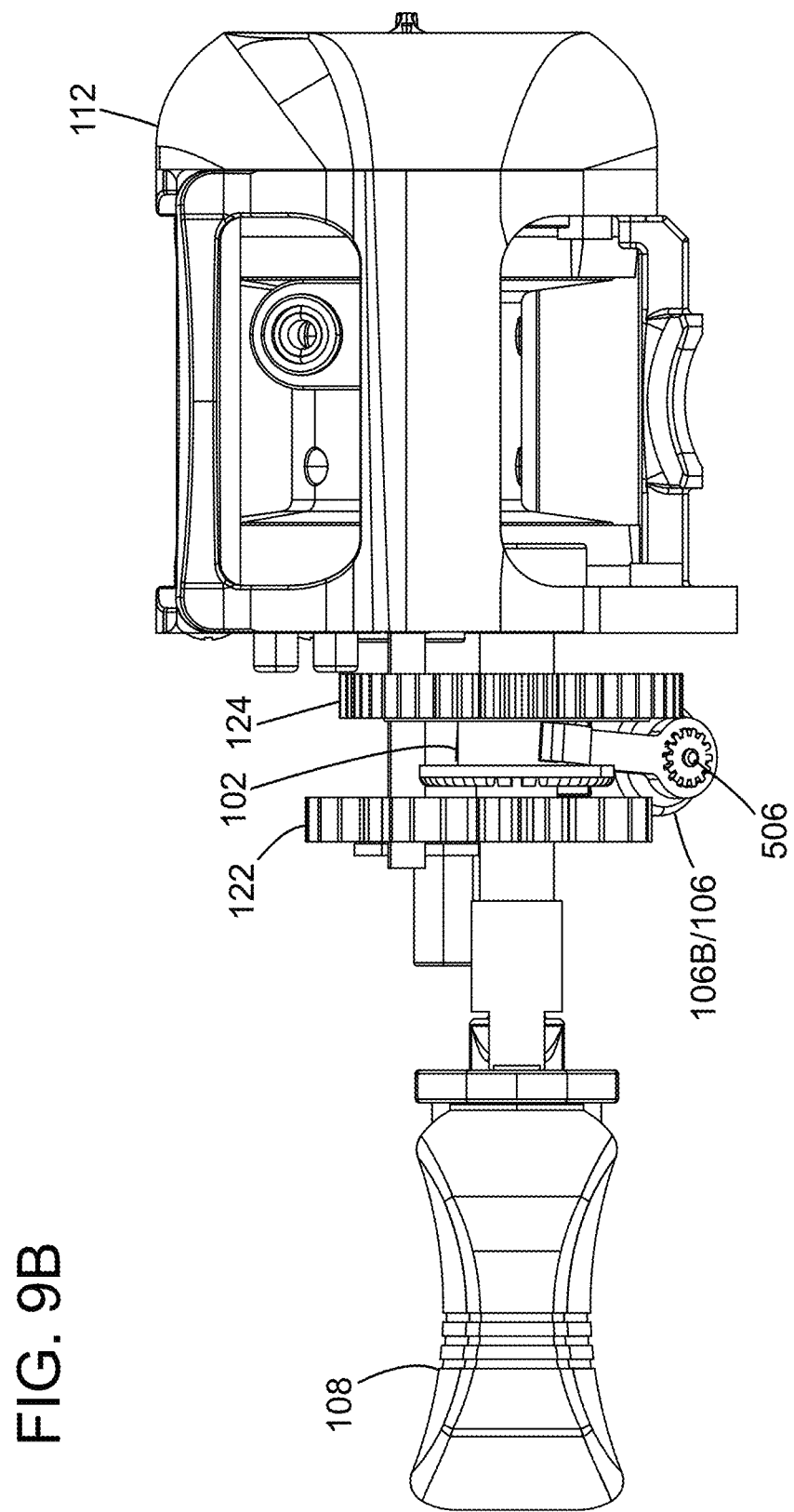

AUTOMATICALLY ADJUSTING VARIABLE GEAR RATIO FISHING REEL

CROSS-REFERENCE TO RELATED APPLICATIONS

This application claims priority to U.S. Provisional Patent Application No. 63/488,547, filed Mar. 6, 2023, the disclosure of which is hereby incorporated by reference in its entirety.

TECHNICAL FIELD

The present disclosure relates to fishing reels. More specifically, the disclosure relates to automatically adjusting variable gear ration fishing reels.

BACKGROUND OF THE INVENTION

In fishing, there are often times when it would be beneficial to have a fishing reel with greater torque generated by the handle on the spool and less reel-in speed of the spool relative to the crank speed of the handle and vice versa. For example, in fishing such as bass fishing, a fisherman may find it beneficial to have a relatively high torque and low reel-in speed when pulling a fish from underwater weeds or grass, or when pulling in a heavy bait. On the other hand, a fisherman may desire a relatively low torque and high reel-in speed in order to make as many casts as possible or when a fish suddenly changes directions and swims toward the boat.

The same is true for deep sea and onshore fishing. For example, it may be beneficial to have a high torque and low reel-in speed when trying to reel in a large fish. Alternatively, a low torque and high reel-in speed may be desirable if the fish suddenly changes direction and swims toward the boat or when the fish is tired and not struggling much.

Further, the need to change torque and speed may change in an instant. For example, if a fish changes direction quickly, the need to change speed and torque may also change quickly in order to prevent the hook from being dislodged from the fish's mouth. However, if changing torque and speed requires manual adjustments, the fisherman may not have the time or may not be in a position to let go of the fishing rod in order to make the adjustments fast enough.

Accordingly, there is a need for a fishing reel that can change the torque generated by the handle on the spool and the reel-in speed of its spool relative to the crank speed of its handle. There is also a need to have a fishing reel, wherein the torque and speed changes are made automatically and without manual manipulation in order to make the changes quickly.

SUMMARY OF THE INVENTION

The present disclosure offers advantages and alternatives over the prior art by providing a fishing reel that that can automatically change the torque generated by the handle on the spool and the reel-in speed of its spool relative to the crank speed of its handle. The fishing reel is operable to detect the rotational speed of the crankshaft and compare it to a threshold speed. If the rotational speed of the crankshaft (and therefore, the handle) is at or below the threshold speed, then the gear ratio between crankshaft and spool shaft automatically shifts to a first (or low speed) gear ratio. If the rotational speed of the crankshaft is above the threshold speed, then the gear ratio between the crankshaft and the spool shaft automatically shifts to a second (or high speed) gear ratio, wherein the second gear ratio is greater than the first gear ratio.

A fishing reel in accordance with one or more aspects of the present disclosure includes a handle assembly connected to a crankshaft. A low-speed and a high-speed drive gear is mounted on the crankshaft. The drive gears are configured to be affixed axially relative to the crankshaft. An engagement hub is mounted on the crankshaft between the drive gears. The engagement hub is configured to be movable axially relative to the crankshaft between a first gear ratio position and a second gear ratio position. A yoke has a first end portion engaging the engagement hub. A shifting mechanism engages a second end portion of the yoke. The shifting mechanism is operable to move the yoke. A speed sensor is configured to detect rotational speed of the crankshaft. When the speed sensor detects rotational speed at or below a predetermined threshold speed, a first command signal is sent to the shifting mechanism to move the yoke to axially urge the engagement hub to its first gear ratio position in which the engagement hub engages with the low-speed drive gear. When the speed sensor detects rotational speed above the threshold speed, a second command signal is sent to the shifting mechanism to move the yoke to axially urge the engagement hub to its second gear ratio position in which the engagement hub engages with the high-speed drive gear.

An alternative fishing reel in accordance with one or more aspects of the present disclosure includes a low-speed and a high-speed drive gear mounted on a crankshaft. The drive gears are configured to be affixed axially relative to the crankshaft. An engagement hub is mounted on the crankshaft between the drive gears. The engagement hub is configured to be movable axially relative to the crankshaft. A yoke engages the engagement hub. A shifting mechanism engages the yoke. The shifting mechanism is operable to move the yoke. A speed sensor is configured to detect rotational speed of the crankshaft. When the speed sensor detects rotational speed at or below a predetermined threshold speed, a first command signal is sent to the shifting mechanism to move the yoke to axially urge the engagement hub to engage with the low-speed drive gear. When the speed sensor detects rotational speed above the threshold speed, a second command signal is sent to the shifting mechanism to move the yoke to axially urge the engagement hub to engage with the high-speed drive gear.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits and advantages described herein.

BRIEF DESCRIPTION OF THE DRAWINGS

The disclosure will be more fully understood from the following detailed description taken in conjunction with the accompanying drawings, in which:

FIG. 3A depicts an enlarged left side exploded view of the drive gear assembly of FIG. 2, according to aspects described herein;

FIG. 3B depicts an enlarged right side exploded view of the drive gear assembly of FIG. 2, according to aspects described herein;

FIG. 4A depicts a top view of the fishing reel of FIG. 1, wherein the engagement hub is in its first (low-speed) gear ratio position, according to aspects described herein;

FIG. 6 depicts an exploded view of an alternative fishing reel having an optical sensor as a speed sensor and a solenoid subassembly as a shift mechanism, according to aspects described herein;

FIG. 8 depicts an exploded view of another fishing reel having a magnetic sensor as a speed sensor and a servomotor as a shift mechanism, according to aspects described herein;

FIG. 9A depicts a side view of the fishing reel of FIG. 8, wherein the engagement hub is in its first (low-speed) gear ratio position, according to aspects described herein; and FIG. 9B depicts a side view of the fishing reel of FIG. 8, wherein the engagement hub is in its second (high-speed) gear ratio position, according to aspects described herein.

DETAILED DESCRIPTION OF THE INVENTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

The terms "significantly", "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1:
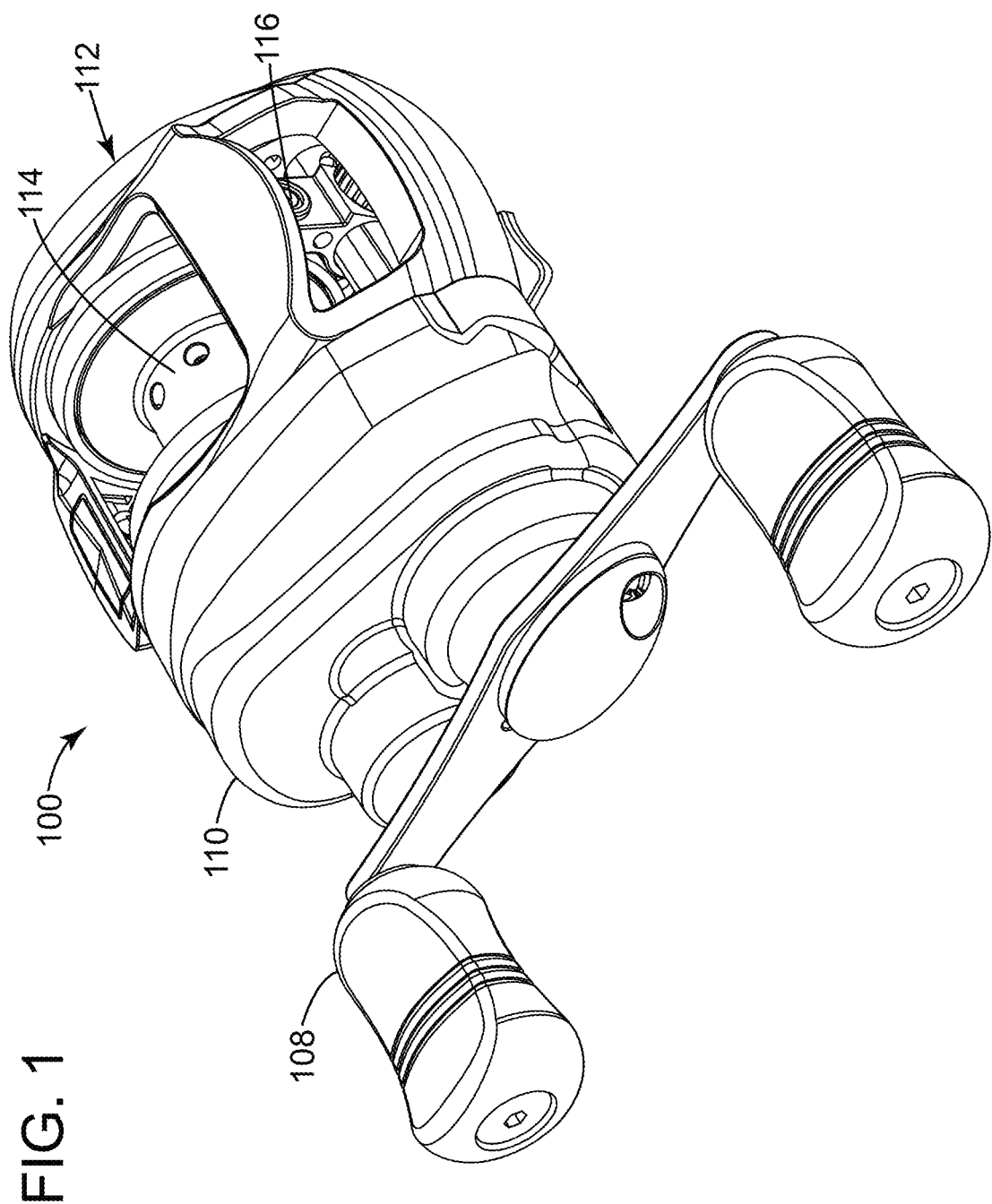
FIG. 1 depicts a perspective view of a fishing reel having an engagement hub that is automatically movable between a first (low speed) gear ratio position and a second (high speed) gear ratio position, according to aspects described herein.
Figure 2:
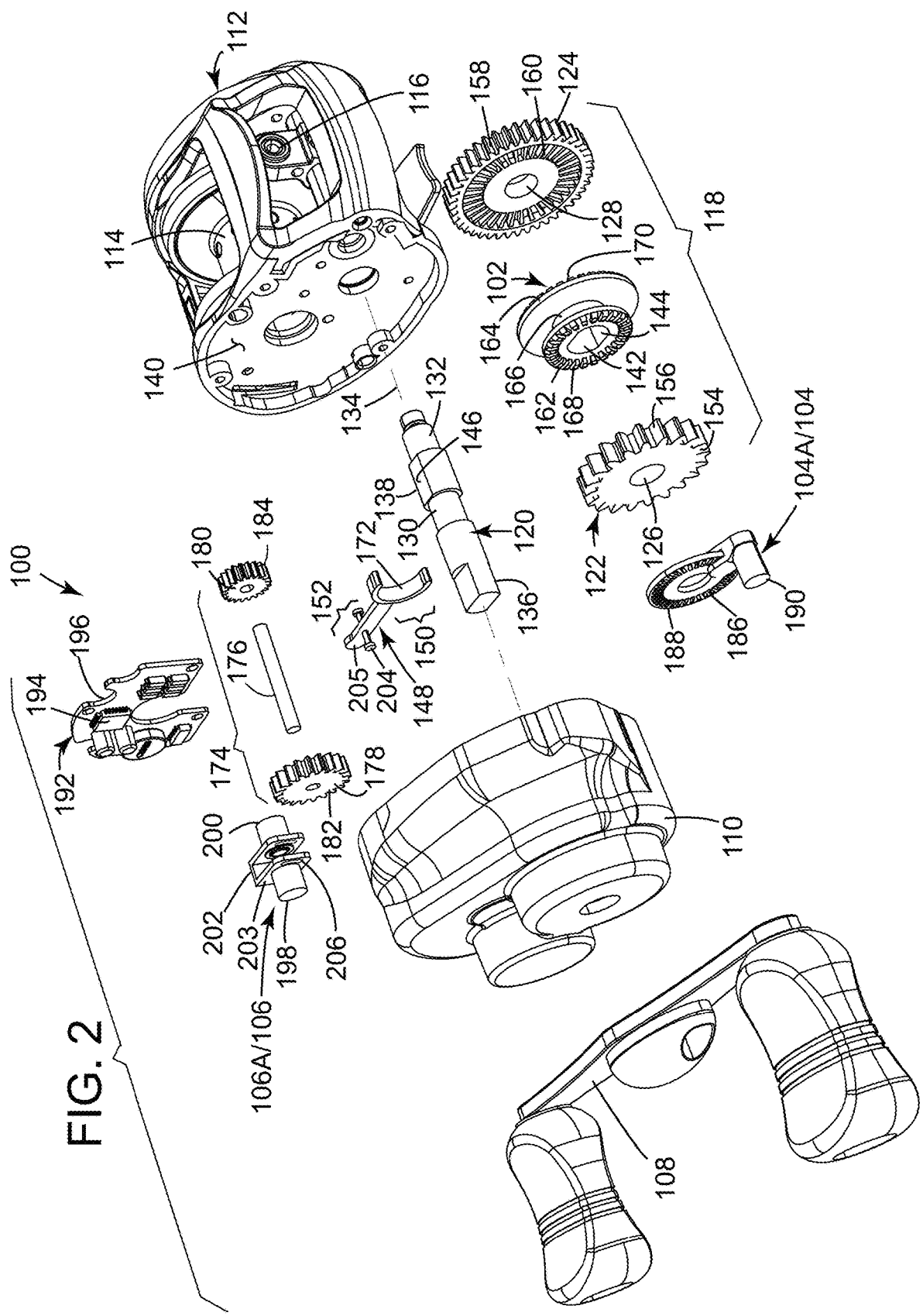
FIG. 2 depicts an exploded view of the fishing reel of FIG. 1, according to aspects described herein.

Referring to FIGS. 1 and 2, an example is depicted of a perspective view (FIG. 1) and an exploded view (FIG. 2) of a fishing reel 100 having an engagement hub (or hub) 102 that is automatically movable between a first (low speed) gear ratio position (see FIG. 4A) and a second (high speed) gear ratio position (see FIG. 4B), according to aspects described herein. In the example illustrated in FIGS. 1-4B, the fishing reel 100 has an optical speed sensor (or optical sensor) 104A as a speed sensor 104 and an electromagnetic subassembly 106A as a shift mechanism 106. The fishing reel 100 may be any type of fishing reel, including, without limitation, bait casting fishing reels, spin casting fishing reels, deep sea fishing reels, fly fishing reels or the like."

Referring more specifically to FIG. 1, fishing reel 100 has many components that are associated with a conventional single-speed fishing reel. For example, the fishing reel 100 includes a handle 108 rotationally engaged with a gear housing 110. The gear housing 110 is connected to a frame assembly 112. The frame assembly 112 encloses a spool 114 and line guide assembly 116. The line guide assembly 116 guides a fishing line (not shown) onto and off of the spool 114 as the line is cast out or reeled in by the fishing reel 100.

However, as will be explained in greater detail herein, fishing reel 100 includes a drive gear assembly 118 (see FIG. 2) which has an engagement hub 102 that is operable to automatically move between a first (low speed) gear ratio position (see FIG. 4A) and a second (high speed) gear ratio position (see FIG. 4B). Accordingly, the fishing reel 100 can automatically change the torque generated by the handle 108 on the spool 114 and the reel-in speed of its spool 114 relative to the crank speed of its handle 108.

Referring more specifically to FIG. 2, the handle (or handle assembly) 108 is connected to a crankshaft 120, which is a part of the dive gear assembly 118. The drive gear assembly 118 also includes a low-speed drive gear 122, a high-speed drive gear 124 and the engagement hub 102 all mounted on the crankshaft 120.

The low-speed and a high-speed drive gears 122, 124 are configured to be affixed axially relative to the crankshaft 120 and to rotate independently relative to the crankshaft 120. In the example illustrated in FIG. 2, the low-speed and high-speed drive gears 122, 124 have cylindrical center holes 126 and 128 respectively, which are configured to rotate freely around corresponding cylindrical portions 130 and 132 of the crankshaft 120. The low-speed drive gear 122 is captured and prevented from moving axially along the axis 134 of the crankshaft 120 by a front portion 136 and a mid-portion 138 of the crankshaft 120, both of which have larger diameters than the cylindrical portions 130, 132 of the crankshaft and the center holes 126, 128 of the low-speed and high-speed drive gears 122, 124. The high-speed drive gear 124 is captured and prevented from moving axially along the axis 134 of the crankshaft 120 by the mid-portion 138 of the crankshaft 120 and the front wall 140 of the frame assembly 112.

The engagement hub 102 is mounted on the crankshaft 120 between the drive gears 122, 124. The engagement hub 102 is configured to be movable axially relative to the crankshaft 120 and is also configured to be affixed rotationally relative to the crankshaft 120. As will be explained in greater detail herein, the engagement hub 102 may move axially between a first gear ratio position (see FIG. 4A), in which the engagement hub 102 engages with the low-speed drive gear 122, and a second gear ratio position (see FIG. 4B), in which the engagement hub 102 engages with the high-speed drive gear 124.

In the example illustrated in FIG. 2, the engagement hub 102 has a center hole 142, with a flat section 144 extending therethrough. The flat section 144 of the engagement hub through hole 142 is configured to mate with a flat section 146 on the mid-portion 138 of the crankshaft 120. The two mating flat sections 144, 146 enable the engagement hub 120 to move axially between the first and second gear ratio position (see FIGS. 4A and 4B), while simultaneously being locked in with the rotation of the crankshaft 120.

A yoke 148 has a first end portion 150, which engages the engagement hub 102. The yoke 148 also includes a second end portion 152, which engages the shifting mechanism 106. The shifting mechanism 106 is operable to move the yoke 148. The speed sensor 104 is configured to detect rotational speed of the crankshaft 120.

During operation, when the speed sensor 104 detects that a rotational speed of the crankshaft 120 and handle 108 are at or below a predetermined threshold rotational speed, then a first command signal is sent to the shifting mechanism 106 to move the yoke 148 to axially urge the engagement hub 102 to its first gear ratio position (FIG. 4A) in which the engagement hub 102 engages with the low-speed drive gear 122. As a result of the engagement with the engagement hub 102, the low-speed drive gear 122 becomes affixed rotationally relative to the crankshaft 120. When the speed sensor 104 detects that a rotational speed of the crankshaft 120 and handle 108 are above the predetermined threshold rotational speed, a second command signal is sent to the shifting mechanism 106 to move the yoke 148 to axially urge the engagement hub 102 to its second gear ratio position (FIG. 4B) in which the engagement hub 102 engages with the high-speed drive gear 124. As a result of the engagement with the engagement hub 102, the high-speed drive gear 124 becomes affixed rotationally relative to the crankshaft 120.

Referring to FIGS. 3A and 3B, an enlarged left side (FIG. 3A) and right side (FIG. 3B) exploded view of the drive gear assembly 118 of FIG. 2 is shown. As discussed earlier herein, the drive gear assembly 118 includes the crankshaft 120, the low-speed drive gear 122, the high-speed drive gear 124 and the engagement hub 102.

The low-speed drive gear 122 includes a set of low-speed drive gear teeth 154 disposed on a circumferential surface of the low-speed drive gear 122 and a set of low-speed face gear teeth 156 (FIG. 4B) disposed on a side surface of the low-speed drive gear 122 that is facing the engagement hub 102. The high-speed drive gear 122 includes a set of high-speed drive gear teeth 158 disposed on a circumferential surface of the high-speed drive gear 124 and a set of high-speed face gear teeth 160 (FIG. 3A) disposed on a side surface of the high-speed drive gear 124 that is facing the engagement hub 102.

The engagement hub 102 is configured to be affixed rotationally to the crankshaft 102 and includes a first flange, 162, a second flange 164 and a groove 166 disposed therebetween. The first flange 162 has a set of first engagement teeth 168 (FIG. 3A) facing the low-speed drive gear 122. The second flange 164 has a set of second engagement teeth 170 (FIG. 3B) facing the high-speed drive gear 124. The groove 166 is positioned between the first and second flanges 162, 164.

The groove 166 has a width and diameter that are sized to receive an arcuate distal end section 172 of the first end portion 150 of the yoke 148. The arcuate distal end section 172 conforms to the diameter of the groove 166 of the engagement hub 102 and is used to move the engagement hub 102 axially between the first and second gear ratio positions (see FIGS. 4A and 4B).

During operation, when the engagement hub 102 is in its first gear ratio position (FIG. 4A), the low-speed face gear teeth 156 of the low-speed drive gear 122 mesh with the first engagement teeth 168 of the first flange 162 to rotationally affix the low-speed drive gear 122 with the crankshaft 120. When the engagement hub 102 is in its second gear ratio position (FIG. 4B), the high-speed face gear teeth 160 of the high-speed drive gear 124 mesh with the second engagement teeth 170 of the second flange 164 to rotationally affix the high-speed drive gear 124 with the crankshaft 102.

Referring back to FIG. 2, the fishing reel 100 also includes a spool gear assembly 174, that includes a spool shaft 176, a low-speed following gear 178 and a high-speed following gear 180. The spool shaft 174 is connected to, and drives, the spool 114. The spool 114 is configured to reel in a fishing line (not shown).

The low-speed following gear 178 is rigidly affixed to the spool shaft 176. The low-speed following gear 178 has a set of low-speed following gear teeth 182 disposed on a circumferential surface to the low-speed following gear 178. The low-speed following gear teeth 182 are configured to mesh with the low-speed drive gear teeth 154 disposed on the circumferential surface of the low-speed drive gear 122 at a first gear ratio. The first gear ratio is defined herein as the ratio of the total number of low-speed drive gear teeth 154 to the total number of low-speed following gear teeth 182.

The high-speed following gear 180 is rigidly affixed to the spool shaft 176. The high-speed following gear 180 has a set of high-speed following gear teeth 184 that are disposed on a circumferential surface of the high-speed following gear 180. The high-speed following gear teeth 184 are configured to mesh with the high-speed drive gear teeth 158 that are disposed on the circumferential surface of the high-speed drive gear 124 at a second gear ratio. The second gear ratio is defined herein as the ratio of the total number of high-speed drive gear teeth 158 to the total number of high-speed following gear teeth 184. The second gear ratio is greater than the first gear ratio.

During operation, when the engagement hub 102 is in its first gear ratio position (FIG. 4A), then for each revolution of the handle assembly 108 (or crankshaft 120), the number of revolutions of the spool 114 is equal to the first gear ratio. When the engagement hub 102 is in its second gear ratio position (FIG. 4B), then for each revolution of the handle assembly 108 (or crankshaft 120), the number of revolutions of the spool 114 is equal to the second gear ratio. Accordingly, the fishing reel 100 is advantageously able to change the rotational speed of the spool 114 relative to the rotational speed of the handle 108 and crankshaft 120.

The speed sensor 104 is configured to generate a speed signal indicative of the detected rotational speed of the crankshaft 120 and handle 108. As shown in FIG. 2, the speed sensor 104 includes an optical sensor (or optical speed sensor) 104A. For example, the optical sensor 104A may be a micro photoelectric sensor having a series number of PM-25, PM-45 or PM-65, which is manufactured by Panasonic Industries of North America, Newark, New Jersey of similar. The optical sensor 104A includes a sensor wheel 186 mounted to the crankshaft 120. The sensor wheel 186 has a plurality of equally spaced markings 188 that are disposed around a circumference of the sensor wheel 186. The optical sensor 104A also includes an optical encoder 190 mounted on the housing 110 of the fishing reel 100. The encoder 190 straddles the sensor wheel 186 and detects the markings 188 as they pass by the encoder 190. The encoder 190 provides a pulsed output for each marking 188 on the sensor wheel 186 as the marking 188 passes by the encoder 190. Therefore, in this case, the speed signal generated from the speed sensor 104 includes the pulsed output from the encoder 190.

The number of pulses provided by the encoder 190 in a predetermined period of time is indicative of the rotational speed of the crankshaft 120.

FIG. 2 shows a control system 192 configured to receive the speed signal and compare the indicated speed of the speed signal to a threshold speed. When the indicated speed of the speed signal is at or below the threshold speed, the first command signal is sent by the control system 192 to the shifting mechanism 106. When the indicated speed of the speed signal is above the threshold speed, the second command signal is sent by the control system 192 to the shifting mechanism 106.

The control system 192 may include a microprocessor 194 mounted on a printed circuit board 196. The microprocessor 194 has a memory and an algorithm stored within the memory. The algorithm is operable to receive the speed signal from the speed sensor 104, compare the indicated speed of the speed-signal to the threshold speed and generate the first and second command signals to the shifting mechanism 106.

As shown in FIG. 2, the shifting mechanism includes an electromagnetic subassembly 106A. The electromagnetic subassembly 106A includes a first electromagnet 198 and a second electromagnet 200 that are disposed on opposing sides (or legs) 203 of a U-shaped holding bracket 202. The legs 203 of the holding bracket 202 straddle at least a flat distal end section 205 of the second end portion 152 of the yoke 148. A pair of tabs 204 on the yoke 148 fit into slots 206 on the legs 203 of the bracket 202 to hold the second end portion 152 of the yoke 148 in place between the magnets 198, 200 on either side of the bracket 202.

When the first command signal is sent to the shifting mechanism 106A by the control system 192, the first electromagnet 198 is activated. The activated first electromagnet 198 then exerts an attractive force on at least the flat distal end section 205 of the yoke 148 to move or pull the yoke 148 toward the first electromagnet 198. Accordingly, the arcuate distal end section 172 of the yoke 102, that is positioned within the groove 166 of the engagement hub 102, axially presses against the first flange 162 of the engagement hub 102 to urge the engagement hub 102 to its first gear ratio position (FIG. 4A).

When the second command signal is sent to the shifting mechanism 106A by the control system 192, the second electromagnet 200 is activated. The activated second electromagnet 200 then exerts an attractive force on at least the flat distal end section 205 of the yoke 148 to move or pull the yoke 148 toward the second electromagnet 200. Accordingly, the arcuate distal end section 172 of the yoke 102, that is positioned within the groove 166 of the engagement hub 102, axially presses against the second flange 164 of the engagement hub 102 to urge the engagement hub 102 to its second gear ratio position (FIG. 4B).

Figure 4B:
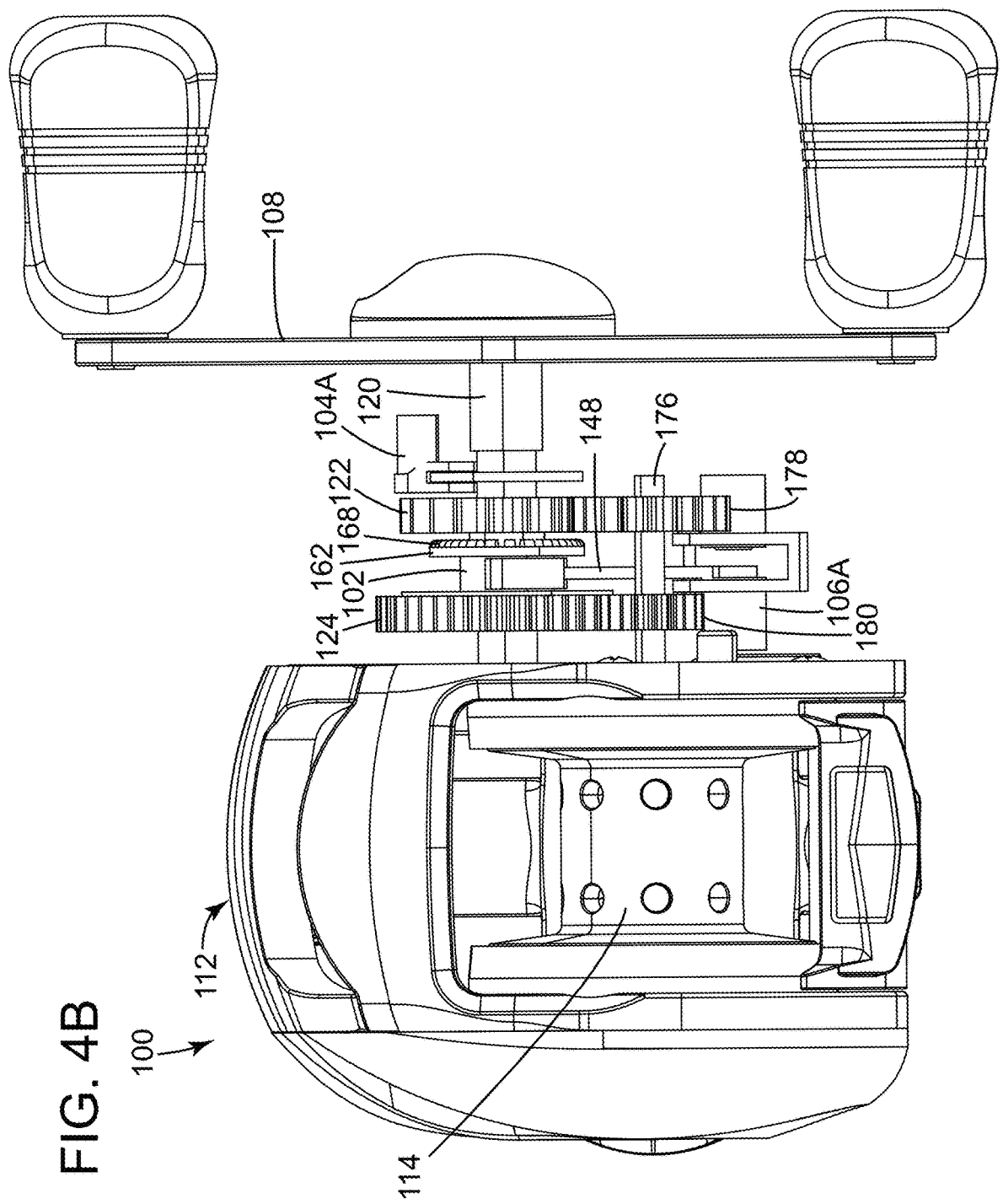
FIG. 4B depicts a top view of the fishing reel of FIG. 1, wherein the engagement hub is in its second (high-speed) gear ratio position, according to aspects described herein.

Referring to FIGS. 4A and 4B, a top view of the fishing reel 100 is shown, wherein the engagement hub 102 is in its first (low-speed) gear ratio position (FIG. 4A), and wherein the engagement hub 102 is in its second (high-speed) gear ratio position (FIG. 4B), according to aspects described herein.

FIGS. 4A and 4B show the optical sensor 104A mounted on the crankshaft 120 measures the rotational speed of the crankshaft 120 and handle 108, which is monitored by the control system 192. When the rotational speed is determined to be below or above the predetermined threshold speed, the control system 192 sends a first or second command signal to the electromagnetic subassembly 106A (i.e., the shifting mechanism 106) to activate the first or second electromagnet 198, 200 to pull the yoke 148 and urge the engagement hub 102 into either its first (low-speed) gear ratio position (FIG. 4B) or its second (high-speed) gear ratio position (FIG. 4B).

In the first (low-speed) gear ratio position (FIG. 4A), the yoke 148 pushes on the first flange 162 of the engagement hub 102 so that the first engagement teeth 168 on the first flange 162 of the engagement hub 102 are meshed (or engaged) with the low-speed face gear teeth 156 of the low-speed drive gear 122. Additionally, the second engagement teeth 170 on the second flange 164 of the engagement hub 102 are disengaged (or separated) from the high-speed face gear teeth 160 of the high-speed drive gear 124. Once the engagement hub 102 engages with the low-speed drive gear 122, the low-speed drive gear 122 becomes the driving gear of the system and drives the low-speed following gear 178 that is rigidly attached to the spool shaft 176. The rotational speed of the spool shaft 176 and the spool 114 will then be determined by the rotational speed of the crankshaft 120 multiplied by the first gear ratio. The first gear ratio is equal to a ratio of the total number of low-speed drive gear teeth 154 of the low-speed drive gear 122 to the total number of low-speed following gear teeth 182 of the low-speed following gear 178. The high-speed following gear 180, which is also rigidly attached to the spool shaft 176, and the high-speed drive gear 124, which freely rotates on the crankshaft 120, will follow along at the rotational speed of the low-speed following gear 178.

In the second (high-speed) gear ratio position (FIG. 4B), the yoke 148 pushes on the second flange 164 of the engagement hub 102 so that the second engagement teeth 170 on the second flange 164 of the engagement hub 102 are meshed (or engaged) with the high-speed face gear teeth 160 of the high-speed drive gear 124. Additionally, the first engagement teeth 168 on the first flange 162 of the engagement hub 102 are disengaged (or separated) from the low-speed face gear teeth 156 of the low-speed drive gear 122. Once the engagement hub 102 engages with the high-speed drive gear 124, the high-speed drive gear 124 becomes the driving gear of the system and drives the high-speed following gear 180 that is rigidly attached to the spool shaft 176. The rotational speed of the spool shaft 176 and the spool 114 will then be determined by the rotational speed of the crankshaft 120 multiplied by the second gear ratio. The second gear ratio is equal to a ratio of the total number of high-speed drive gear teeth 158 of the high-speed drive gear 124 to the total number of high-speed following gear teeth 184 of the high-speed following gear 180. The low-speed following gear 178, which is also rigidly attached to the spool shaft 176, and the low-speed drive gear 122, which freely rotates on the crankshaft 120, will follow along at the rotational speed of the high-speed following gear 180.

Figure 5:
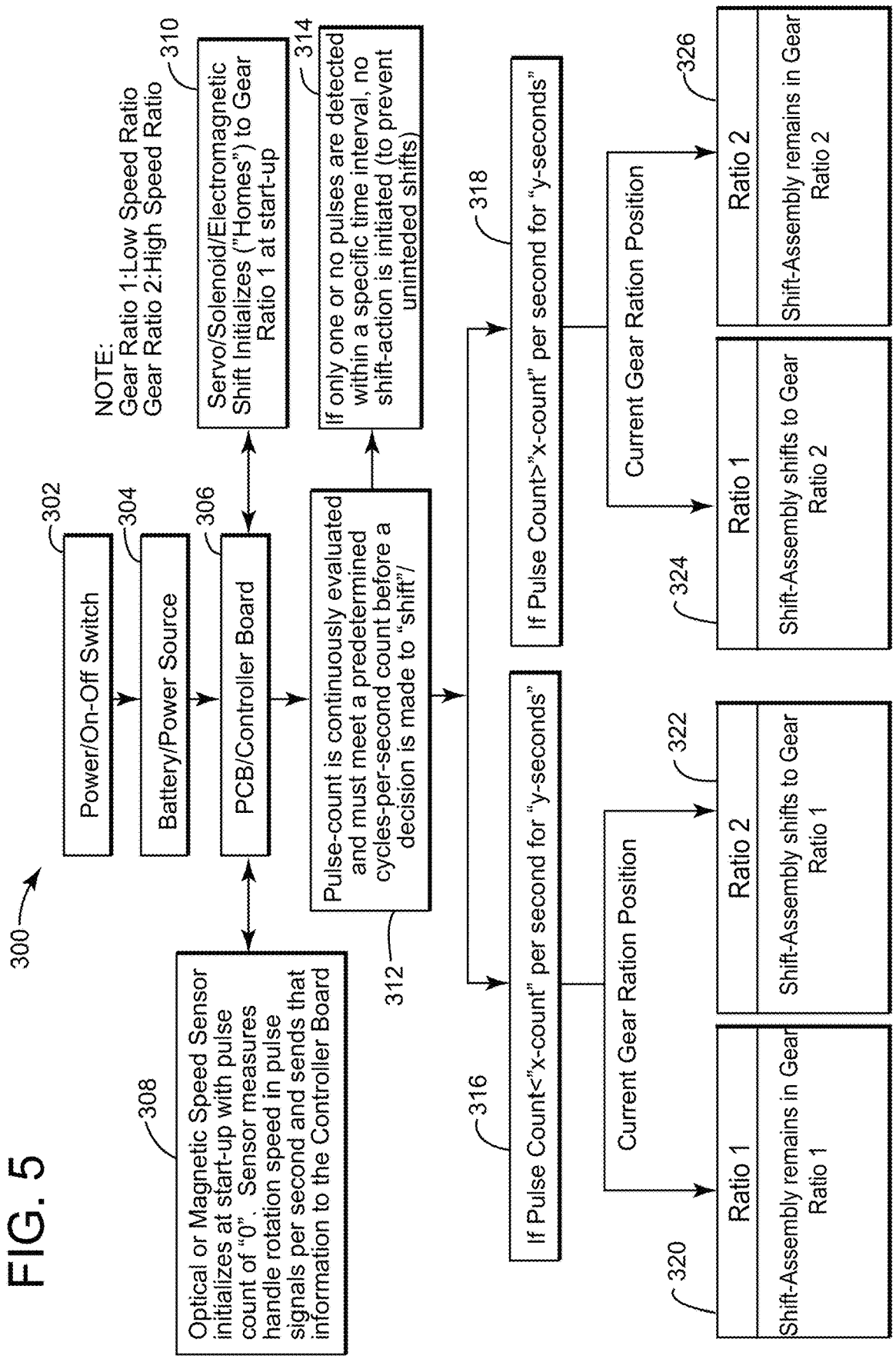
FIG. 5, depicts a flow diagram of an algorithm in a control system of the fishing reel of FIG. 1 for shift-selection between the first gear ratio position and second gear ratio position of the engagement hub, according to aspects described herein.

Referring to FIG. 5, a flow diagram of an algorithm 300 in the control system 192 of the fishing reel 100 for shift-selection between the first gear ratio position and second gear ratio position of the engagement hub 102, according to aspects described herein is shown.

The algorithm 300 advantageously provides a safety check (or double check) against unintentional changes in the rotational speed of the handle 108 and crankshaft 120. By way of example, such unintentional changes may occur when a fisherman inadvertently hits the handle 108 as he is reaching for some other object on the boat, or moves his hand quickly when the fisherman first feels the pull of a fish on the line attached to the fishing reel 100. Accordingly, the algorithm 300 is designed to detect at least two speed signals separated by a predetermined time interval that both indicate that the rotational speed of the handle 108 has shifted below or above the threshold speed before a command signal to shift the engagement hub 102 between the first and second gear ratio positions is generated.

The algorithm includes detecting a first and a second speed signal separated by a predetermined time interval. If the indicated speeds of both the first and second speed signals are at or below the speed threshold, then:

If the engagement hub 102 is in its first gear ratio position (FIG. 4A), then no command signal is generated.

If the engagement hub 102 is in its second gear ratio position (FIG. 4B), then the first command signal is generated to move the engagement hub 102 to its first gear ratio position (FIG. 4A).

If the indicated speeds of both the first and second speed signals are above the speed threshold, then:

If the engagement hub 102 is in its first gear ratio position (FIG. 4A), then the second command signal is generated to move the engagement hub 102 to its second gear ratio position (FIG. 4B).

If the engagement hub 102 is in its second gear ratio position (FIG. 4B), then no command signal is generated.

More specifically, the example of the algorithm 300 illustrated in FIG. 5 starts at 302, wherein a power switch (not shown) is switched on. At 304, the battery functions as a power source for the fishing reel 100, which is activated by the power switch.

The power source (not shown) at 304 provides electrical power to all components and systems throughout fishing reel 100, including, without limitation, various embodiment of the speed sensor 104, shifting mechanism 106 and control system 192. Though a battery is indicated at 304 as functioning as the power source, the power source may be any number of configurations of power supply systems. For example, the power source may include a plurality of batteries. Also, the power source may include one or more rechargeable batteries electrically connected to a charging system. The charging system may, for example, be mechanically linked to the crankshaft 120 or handle 108 so that at least a portion of the mechanical power applied to turning the handle 108 by a user is converted to electrical power by the charging system and used to recharge the batteries within the power source system. Additionally, by way of example, the power source may be rechargeable by connection to a standard home 110 volt electrical outlet. Moreover, the power source may be configured to be rechargeable through solar power.

At 306, the control system 192 mounted on the printed circuit board 196 is activated. At 308, the speed sensor 106 is activated with a pulse count of zero (0). The speed sensor 104 measures the handle 108 rotational speed in pulse signals per second and sends that information to the control system 192.

At 310, the shifting mechanism 106 is activated. Upon activation, the control system 192 initializes the shifting mechanism 106 to the first gear ratio position (FIG. 4A).

At 312, the pulse count from the speed sensor 104 is continuously evaluated. The pulse count must rise above or fall below the threshold speed, in a predetermined pulses per second count, before a command signal to shift gear ration positions is generated.

At 314, only one or no pulses per second are detected by the control system 192 within a specific time interval, then no command signal to shift is generated. The requirement for two or more pulses per second within the specific time interval that indicate a change in rotational speed of the handle 108 that rises above or falls below the threshold speed, is to prevent unintended shifts in the engagement hub 102.

At 316, if the rotational speed is less than or equal to the threshold speed, then:

At 320, if the engagement hub 102 is in the first gear ratio position (FIG. 4A), then no command signal is generated and the engagement hub 102 remains in the first gear ratio position (FIG. 4A).

At 322, if the engagement hub 102 is in the second gear ratio position (FIG. 4B), then the first command signal is generated and the engagement hub 102 shifts to the first gear ratio position (FIG. 4A).

At 318, if the rotational speed is greater than the threshold speed, then:

At 324, if the engagement hub 102 is in the first gear ratio position (FIG. 4A), then the second command signal is generated and the engagement hub 102 shifts to the second ratio position (FIG. 4B).

At 326, if the engagement hub 102 is in the second gear ratio position (FIG. 4B), then no command signal is generated and the engagement hub 102 remains in the second gear ratio position (FIG. 4B).

Referring to FIG. 6, an exploded view of an alternative fishing reel 400 having an optical sensor 104A as a speed sensor 104 and a solenoid subassembly 106B as a shift mechanism 106, according to aspects described herein is seen. The components and function of the fishing reel 400 is similar to fishing reel 100 except that the shift mechanism 106 now includes a solenoid subassembly 106B instead of the electromechanical subassembly 106A. Accordingly, for purposes of brevity, the functions of the same or similar components used in fishing reel 100 will be omitted.

Figure 7A:
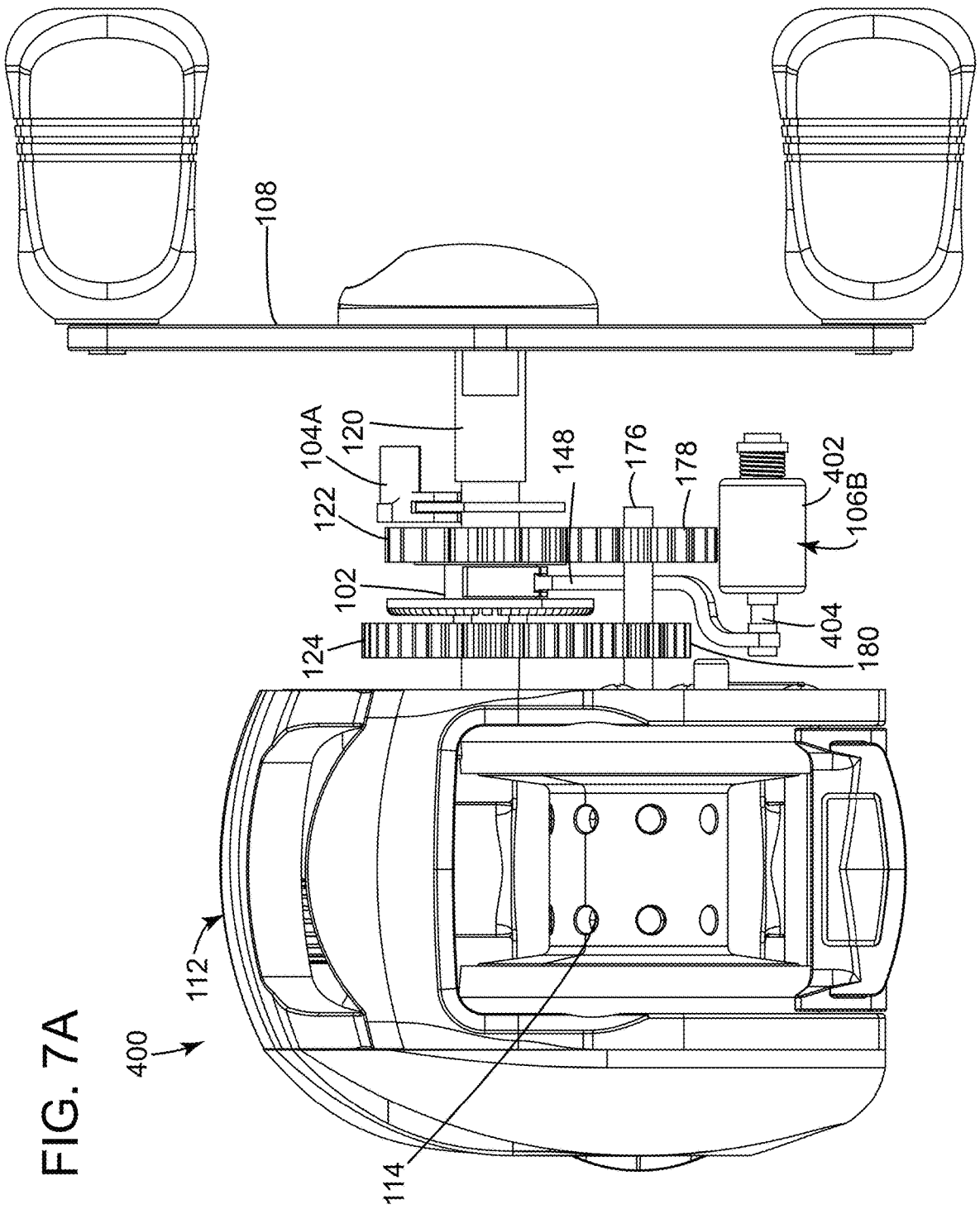
FIG. 7A depicts a top view of the fishing reel of FIG. 6, wherein the engagement hub is in its first (low-speed) gear ratio position, according to aspects described herein.

The solenoid subassembly 106B, includes a solenoid 402 affixed to the housing 110 of the fishing reel 400. For example, the solenoid 402 may be a five volt solenoid manufactured by Delta company of Taiwan having part number DSOS-0416-05D or similar. The solenoid 402 has a shaft 404 that is electrically movable from an extended position (FIG. 7B) to a retracted position (FIG. 7A). The second end portion 152 of the yoke 148 is affixed to the shaft 404 of the solenoid 402.

When the first command signal is sent to the solenoid subassembly 106B, the shaft 404 of the solenoid 402 moves to one of its extended position (FIG. 7B) or its retracted position (FIG. 7A) to move the yoke 148 to axially urge the engagement hub 102 to its first gear ratio position (FIG. 7A). In other words, the solenoid 402 may be oriented such that a retracted shaft 404 may move the engagement hub 102 to its first gear ratio position (FIG. 7A) or its second gear ratio position (FIG. 7A).

Additionally, when the second command signal is sent to the solenoid subassembly 106B, the shaft 404 of the solenoid 402 moves to the other of its extended position or its retracted position to move the yoke 148 to axially urge the engagement hub 102 to its second gear ratio position. In other words, whichever gear ratio position the retracted shaft 404 places the engagement hub 102 in, then the extended shaft 404 must place the engagement hub 102 in the opposite gear ratio position.

Figure 7B:
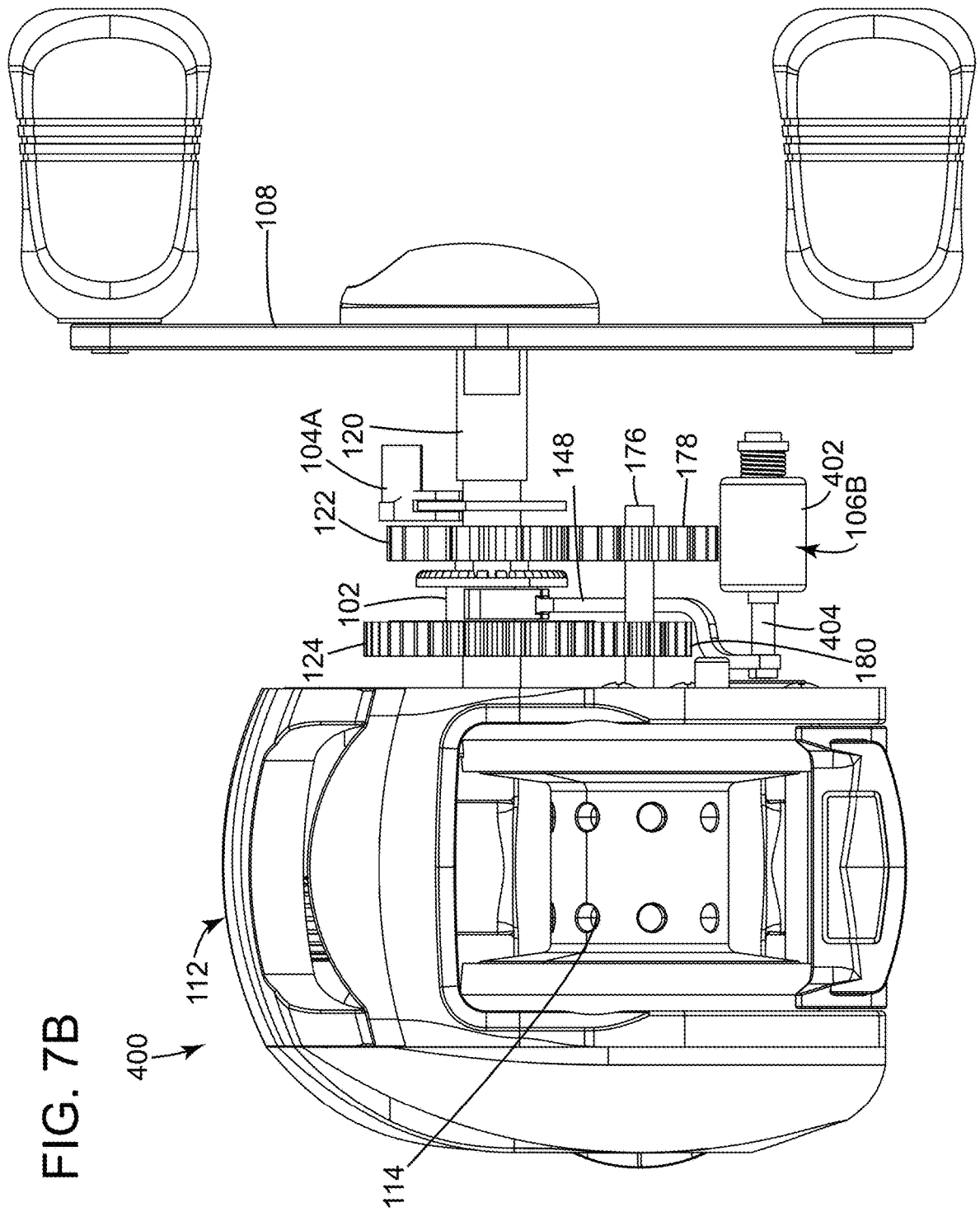
FIG. 7B depicts a top view of the fishing reel of FIG. 6, wherein the engagement hub is in its second (high-speed) gear ratio position, according to aspects described herein.

Referring to FIGS. 7A and 7B, a top view of the fishing reel 400, is seen, wherein the engagement hub 102 is in its first (low-speed) gear ratio position (FIG. 7A), and wherein the engagement hub 102 is in its second (high-speed) gear ratio position (FIG. 7B), is shown. The form and function of the first gear ratio position (FIG. 7A) and second gear position (FIG. 7B) is similar to or the same as that of FIGS.

4A and 4B, except that the shift mechanism 106 is the solenoid subassembly 106B rather than the electromechanical subassembly 106A.

As illustrated in FIGS. 7A and 7B, when the shaft 404 of the solenoid 402 of the solenoid subassembly 106B is in its extended position, then the engagement hub 102 is in its second gear ratio position (FIG. 7B). Additionally, when the shaft 404 of the solenoid 402 of the solenoid subassembly 106B is in its retracted position, then the engagement hub 102 is in its first gear ratio position (FIG. 7A). However, as discussed above, it is within the scope of this disclosure that the solenoid 402 be oriented such that an extended shaft 404 puts the engagement hub 102 in its first gear ratio position and a retracted shaft 404 puts the engagement hub 102 in its second gear ratio position.

Referring to FIG. 8, an exploded view of another fishing reel 500 having a magnetic speed sensor (or magnetic sensor) 104B as a speed sensor 104 and a servomotor or a stepper motor 106C as a shift mechanism 106 is shown. The components and functions of fishing reel 500 are similar to fishing reel 100 except that the shift mechanism 106 now includes a servomotor or stepper motor 106C instead of the electromechanical subassembly 106A and the speed sensor 104 now includes a magnetic sensor 104B instead of an optical sensor 104A. Accordingly, for purposes of brevity, the functions of the same or similar components used in fishing reel 100 will be omitted.

The magnetic sensor 104B includes a magnetic switch 502 that is operable to be switched by an external magnetic field. For example, the magnetic switch 502 may be a magnetic reed switch part number SKU:SEN0481, supplied by Zhiwei Robotics Corp. of Shanghai, China or similar. The magnetic switch 502 is mounted on the gear housing 110 of the fishing reel 500 and facing the handle assembly 108. The magnetic sensor 104B also includes a magnet 504 (such as, for example, a rare earth magnet or similar) mounted on the handle assembly 108 and positioned such that the magnet 504 passes within close proximity of the magnetic switch 502 with each revolution of the handle assembly 108. Accordingly, for each revolution of the handle assembly (or handle) 108, when the magnet 504 passes closest to the magnetic switch 502, the magnetic switch 502 switches to generate a pulsed electric signal that, over a predetermined period of time, is indicative of the rotational speed of the handle assembly 108 and crankshaft 120. The pulsed electric signal is the speed signal, which is indicative of the rotational speed of the handle 108 and crankshaft 120, that is sent to the control system 192 to be compared to the threshold speed.

The servo motor or stepper motor 106C may be a micro servo having part number ROB-09065 supplied by Spark-Fun Electronics, of Niwot, Colorado, USA or similar. A shaft 506 of the servomotor or stepper motor 106C is connected to the second end portion 152 of the yoke 148 via a mechanical linkage. When the first command signal is sent to the servomotor or a stepper motor 106C, the shaft 506 rotates the yoke 148 in one of a clockwise or a counterclockwise direction to axially urge the engagement hub 102 to it first gear ratio position (FIG. 9A), and when the second command signal is sent to the solenoid subassembly 106B, the shaft 506 rotates the yoke 148 in the other of the clockwise or counterclockwise direction to move the yoke 148 to axially urge the engagement hub to its second gear ratio position. In other words, the servomotor or stepper motor 106C may be oriented such that either a clockwise or a counterclockwise rotation of the shaft 506 moves the engagement hub 102 to its first gear ratio position. However, whichever directional rotation of the shaft 506 moves the engagement hub to its first gear ratio position, then the opposite directional rotation of the shaft 506 must move the engagement hub 102 to its second gear ratio position.

Referring to FIGS. 9A and 9B, a top view of the fishing reel 500, wherein the engagement hub 102 is in its first (low-speed) gear ratio position (FIG. 9A), and wherein the engagement hub 102 is in its second (high-speed) gear ratio position (FIG. 9B), is shown. The form and function of the first gear ratio position (FIG. 9A) and second gear position (FIG. 9B) is similar to or the same as that of FIGS. 4A and 4B, except that the shift mechanism 106 is the servomotor or stepper motor 106C rather than the electromechanical subassembly 106A and the speed sensor 104 is the magnetic sensor 104B rather than the optical sensor 104A.

As illustrated in FIGS. 9A and 9B, when the shaft 506 of the servomotor or stepper motor 106C is rotated in a counterclockwise direction, then the engagement hub 102 is urged into its first gear ratio position (FIG. 9A). Additionally, when the shaft 506 of the servomotor or stepper motor 106C is rotated in a clockwise direction, then the engagement hub 102 is urged into its second gear ratio position (FIG. 9B). However, as discussed above, it is within the scope of this disclosure that the servomotor or stepper motor 106C may be oriented such that a clockwise rotation of the shaft 506 may urge the engagement hub 102 into its first gear ratio position and a counterclockwise rotation of the shaft 506 may urge the engagement hub 102 into its second gear ratio position.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A fishing reel comprising:
a handle assembly connected to a crankshaft;
a low-speed and a high-speed drive gear mounted on the crankshaft, the drive gears configured to be affixed axially relative to the crankshaft;
an engagement hub mounted on the crankshaft between the drive gears, the engagement hub configured to be movable axially relative to the crankshaft between a first gear ratio position and a second gear ratio position;
a yoke having a first end portion engaging the engagement hub;
a shifting mechanism engaging a second end portion of the yoke, the shifting mechanism operable to move the yoke; and
a speed sensor configured to detect rotational speed of the crankshaft;
wherein, when the speed sensor detects rotational speed at or below a predetermined threshold speed, a first command signal is sent to the shifting mechanism to move the yoke to axially urge the engagement hub to its first gear ratio position in which the engagement hub engages with the low-speed drive gear, and wherein, when the speed sensor detects rotational speed above the threshold speed, a second command signal is sent to the shifting mechanism to move the yoke to axially urge the engagement hub to its second gear ratio position in which the engagement hub engages with the high-speed drive gear.

2. The fishing reel of claim 1 comprising:

the low-speed drive gear configured to rotate independently relative to the crankshaft, the low-speed drive gear comprising low-speed drive gear teeth disposed on a circumferential surface of the low-speed drive gear and low-speed face gear teeth disposed on a side surface of the low-speed drive gear that is facing the engagement hub;

the high-speed drive gear configured to rotate independently relative to the crankshaft, the high-speed drive gear comprising high-speed drive gear teeth disposed on a circumferential surface of the high-speed drive gear and high-speed face gear teeth disposed on a side surface of the high-speed drive gear that is facing the engagement hub; and the engagement hub configured to be affixed rotationally to the crankshaft, the engagement hub comprising:

a first flange having first engagement teeth facing the low-speed drive gear, a second flange having second engagement teeth facing the high-speed drive gear, and a groove disposed between the first and second flanges;

wherein, when the engagement hub is in its first gear ratio position, the low-speed face gear teeth of the low-speed drive gear mesh with the first engagement teeth of the first flange to rotationally affix the low-speed drive gear with the crankshaft, and wherein, when the engagement hub is in its second gear ratio position, the high-speed face gear teeth of the high-speed drive gear mesh with the second engagement teeth of the second flange to rotationally affix the high-speed drive gear with the crankshaft.

3. The fighting reel of claim 1, comprising:

a spool shaft connected to, and driving, a spool, the spool being configured to reel in a fishing line;

a low-speed following gear rigidly affixed to the spool shaft, the low-speed following gear having low-speed following gear teeth disposed on a circumferential surface to the low-speed following gear, the low-speed following gear teeth configured to mesh with low-speed drive gear teeth disposed on a circumferential surface of the low-speed drive gear at a first gear ratio, the first gear ratio being a ratio of a total number of low speed drive gear teeth to a total number of low-speed following gear teeth;

a high-speed following gear rigidly affixed to the spool shaft, the high-speed following gear having high-speed following gear teeth disposed on a circumferential surface of the high-speed following gear, the high-speed following gear teeth configured to mesh with high-speed drive gear teeth disposed on a circumferential surface of the high-speed drive gear at a second gear ratio, the second gear ratio being a ratio of a total number of high-speed drive gear teeth to a total number of high-speed following gear teeth, the second gear ratio being greater than the first gear ratio;

wherein, when the engagement hub is in its first gear ratio position, then for each revolution of the handle assembly, the number of revolutions of the spool is equal to the first gear ratio, and wherein, when the engagement hub is in its second gear ratio, then for each revolution of the handle assembly, the number of revolutions of the spool is equal to the second gear ratio.

4. The fishing reel of claim 1, comprising:

the speed sensor configured to generate a speed signal indicative of the detected rotational speed of the crankshaft;

a control system configured to receive the speed signal and compare the indicated speed of the speed signal to the threshold speed;

wherein, when the indicated speed of the speed signal is at or below the threshold speed, the first command signal is sent by the control system to the shifting mechanism, and when the indicated speed of the speed signal is above the threshold speed, the second command signal is sent by the control system to the shifting mechanism.

5. The fishing reel of claim 4, wherein the control system comprises a microprocessor having a memory and an algorithm stored within the memory, the algorithm operable to receiving the speed signal from the speed sensor, compare the indicated speed of the speed-signal to the threshold speed and generate the first and second command signals to the shifting mechanism.

6. The fishing reel of claim 5, comprises:

the speed signal further comprising a first and a second speed signal separated by a predetermined time interval; and the algorithm further comprising:

if the indicated speeds of both the first and second speed signals are at or below the speed threshold, then:

if the engagement hub is in its first gear ratio position, then generate no command signal, and if the engagement hub is in its second gear ratio position, then generate the first command signal to move the engagement hub to its first gear ratio position, and if the indicated speeds of both the first and second speed signals are above the speed threshold, then:

if the engagement hub is in its first gear ratio position, then generate the second command signal to move the engagement hub to its second gear ratio position, and if the engagement hub is in its second gear ratio position, then generate no command signal.

7. The fishing reel of claim 1, wherein the speed-senor comprises an optical sensor.

8. The fishing reel of claim 7, wherein the optical sensor comprises:

a sensor wheel mounted to the crankshaft, the wheel having a plurality of equally spaced markings disposed around its circumference; and an optical encoder mounted on a housing of the fishing reel, the encoder straddling the sensor wheel;

wherein the encoder provides a pulsed output for each marking on the sensor wheel, wherein the number of pulses in a predetermined period of time is indicative of the rotational speed of the crankshaft.

9. The fishing reel of claim 1, wherein the speed sensor comprises a magnetic sensor.

10. The fishing reel of claim 9, wherein the magnetic sensor comprises:

a magnetic switch operable to be switched by an external magnetic field, the magnetic switch mounted on a housing of the fishing reel and facing the handle assembly; and a magnet mounted on the handle assembly and positioned such that the magnet passes within close proximity of the magnetic switch with each revolution of the handle assembly;

wherein, for each revolution of the handle assembly, when the magnet passes closest to the magnetic switch, the magnetic switch switches to generate a pulsed electric signal that, over a predetermined period of time, is indicative of the rotational speed of the handle assembly and crankshaft.

11. The fishing reel of claim 1, comprising:
the first end portion of the yoke comprising an arcuate distal end section that conforms to a diameter of a groove of the engagement hub.

12. The fishing reel of claim 1, wherein the shifting mechanism comprises an electromagnetic subassembly.

13. The fishing reel of claim 12, comprising:
The electromagnetic subassembly comprising a first and a second electromagnet disposed on opposing sides of a holding bracket, the holding bracket straddling a distal end section of the second end portion of the yoke;
wherein, when the first command signal is sent to the shifting mechanism, the first electromagnet is activated to move the yoke to axially urge the engagement hub to its first gear ratio position, and when the second command signal is sent to the shifting mechanism, the second electromagnet is activated to move the yoke to axially urge the engagement hub to its second gear ratio position.

14. The fishing reel of claim 1, wherein the shifting mechanism comprises a solenoid subassembly.

15. The fishing reel of claim 14, wherein the solenoid subassembly comprises:
a solenoid affixed to a housing of the fishing reel, the solenoid having a shaft that is electrically movable from an extended position to a retracted position; and
the second end portion of the yoke affixed to the shaft of the solenoid;
wherein, when the first command signal is sent to the solenoid subassembly, the shaft moves to one of its extended position or its retracted position to move the yoke to axially urge the engagement hub to its first gear ratio position, and when the second command signal is sent to the solenoid subassembly, the shaft moves to the other of its extended position or its retracted position to move the yoke to axially urge the engagement hub to its second gear ratio position.

16. The fishing reel of claim 1, wherein the shifting mechanism comprises one of a servomotor or a stepper motor.

17. The fishing reel of claim 16, comprising:
the second end portion of the yoke having a mechanical linkage to a shaft of the one of a servomotor or a stepper motor;
wherein, when the first command signal is sent to the one of a servomotor or a stepper motor, the shaft rotates the yoke in one of a clockwise or a counterclockwise direction to axially urge the engagement hub to it first gear ratio position, and when the second command signal is sent to the solenoid subassembly, the shaft rotates the yoke in the other of the clockwise or counterclockwise direction to move the yoke to axially urge the engagement hub to its second gear ratio position.

18. A fishing reel comprising:
a low-speed and a high-speed drive gear mounted on a crankshaft, the drive gears configured to be affixed axially relative to the crankshaft;
an engagement hub mounted on the crankshaft between the drive gears, the engagement hub configured to be movable axially relative to the crankshaft;
a yoke engaging the engagement hub;
a shifting mechanism engaging the yoke, the shifting mechanism operable to move the yoke; and
a speed sensor configured to detect rotational speed of the crankshaft;
wherein, when the speed sensor detects rotational speed at or below a predetermined threshold speed, a first command signal is sent to the shifting mechanism to move the yoke to axially urge the engagement hub to engage with the low-speed drive gear, and
wherein, when the speed sensor detects rotational speed above the threshold speed, a second command signal is sent to the shifting mechanism to move the yoke to axially urge the engagement hub to engage with the high-speed drive gear.

19. The fishing reel of claim 18, wherein the speed sensor comprises one of an optical sensor or a magnetic sensor.

20. The fishing reel of claim 18, wherein the shifting mechanism comprises one of an electromagnetic subassembly, a solenoid, a servomotor or a stepper motor.

\* \* \* \* \*